US006120236A

United States Patent [19]
Smith

[11] Patent Number: 6,120,236
[45] Date of Patent: Sep. 19, 2000

[54] ENGINE HOIST TRANSMISSION ATTACHMENT

[76] Inventor: Ralph N. Smith, 521 Enterprise Dr., Rohnert Park, Calif. 94928

[21] Appl. No.: 09/109,712

[22] Filed: Jul. 2, 1998

[51] Int. Cl.[7] ....... B65G 7/00
[52] U.S. Cl. ....... 414/589; 414/917
[58] Field of Search ....... 414/589, 590, 414/917; 254/8 B, 134, DIG. 16

[56] References Cited

U.S. PATENT DOCUMENTS

| | | | |
|---|---|---|---|
| 3,062,500 | 11/1962 | Arnes et al. | 254/134 X |
| 4,479,632 | 10/1984 | McIntire et al. | 254/8 B X |
| 5,100,283 | 3/1992 | Carty | 414/590 |
| 5,203,540 | 4/1993 | Lee | 254/DIG. 16 X |
| 5,556,148 | 9/1996 | Skinner | 254/8 B |

*Primary Examiner*—Donald W. Underwood

[57] ABSTRACT

A new engine hoist transmission attachment for enabling an engine hoist to remove and install a transmission. The inventive device includes an adaptor portion coupling with an existing engine hoist. The adaptor portion includes a leveling arm positioned essentially parallel to a lifting arm of the engine hoist. A transmission stand is coupled with the adaptor portion and is adapted for supporting a transmission thereon. The transmission stand includes an upper plate supporting the transmission thereon.

4 Claims, 3 Drawing Sheets

ENGINE HOIST TRANSMISSION ATTACHMENT

BACKGROUND OF THE INVENTION

1. Field of the Invention

The present invention relates to engine hoists and more particularly pertains to a new engine hoist transmission attachment for enabling an engine hoist to remove and install a transmission.

2. Description of the Prior Art

The use of engine hoists is known in the prior art. More specifically, engine hoists heretofore devised and utilized are known to consist basically of familiar, expected and obvious structural configurations, notwithstanding the myriad of designs encompassed by the crowded prior art which have been developed for the fulfillment of countless objectives and requirements.

Known prior art engine hoists include U.S. Pat. No. 5,052,566 to Ziegler; U.S. Pat. No. 4,770,304 to Woods; U.S. Pat. No. 4,090,625 to Walters; U.S. Pat. No. 800,723 to Curtis; U.S. Pat. No. 3,275,296 to Meyer; Patent No. WO 96/26043 to Hodges; and Patent No. WO 85/00581 to Riviere.

While these devices fulfill their respective, particular objectives and requirements, the aforementioned patents do not disclose a new engine hoist transmission attachment. The inventive device includes an adaptor portion coupling with an existing engine hoist. The adaptor portion includes a leveling arm positioned essentially parallel to a lifting arm of the engine hoist. A transmission stand is coupled with the adaptor portion and is adapted for supporting a transmission thereon. The transmission stand includes an upper plate supporting the transmission thereon.

In these respects, the engine hoist transmission attachment according to the present invention substantially departs from the conventional concepts and designs of the prior art, and in so doing provides an apparatus primarily developed for the purpose of enabling an engine hoist to remove and install a transmission.

SUMMARY OF THE INVENTION

In view of the foregoing disadvantages inherent in the known types of engine hoists now present in the prior art, the present invention provides a new engine hoist transmission attachment construction wherein the same can be utilized for enabling an engine hoist to remove and install a transmission.

The general purpose of the present invention, which will be described subsequently in greater detail, is to provide a new engine hoist transmission attachment apparatus and method which has many of the advantages of the engine hoists mentioned heretofore and many novel features that result in a new engine hoist transmission attachment which is not anticipated, rendered obvious, suggested, or even implied by any of the prior art engine hoists, either alone or in any combination thereof.

To attain this, the present invention generally comprises an adaptor portion coupling with an existing engine hoist. The adaptor portion includes a leveling arm positioned essentially parallel to a lifting arm of the engine hoist. The leveling arm has an inner end pivotally secured to the lifting arm via a leveling arm bracket. The leveling arm has a bifurcated bracket extending outwardly from an outer end thereof. The adaptor portion includes a lifting arm coupling bracket extending inwardly of an open outer end of the lifting arm. The lifting arm coupling bracket has a bifurcated bracket disposed on an outer end thereof. The bifurcated brackets have a vertical post extending therebetween. An upper end of the vertical post has a cylindrical collar extending upwardly therefrom. A transmission stand is coupled with the adaptor portion and is adapted for supporting a transmission thereon. The transmission stand includes an upper plate supporting the transmission thereon. The transmission stand includes an intermediate plate pivotally secured to a lower surface of the upper plate. The intermediate plate has a bracket extending outwardly of a pivot point thereof. The bracket adjustably receives an upper plate level adjuster therein. The upper plate level adjuster is comprised of a threaded rod having a handle disposed on a lower end. An upper end of the threaded rod couples with a ball joint receiver disposed on the lower surface of the upper plate. The transmission stand includes a lower plate pivotally secured to a lower surface of the intermediate plate. The lower plate has a cylindrical extension extending downwardly therefrom for being received within the cylindrical collar of the adaptor portion. An upper end of the cylindrical extension has a bracket extending outwardly therefrom. The bracket adjustably receives an intermediate plate level adjuster therein. The intermediate plate level adjuster is comprised of a threaded rod having a handle disposed on a lower end. An upper end of the threaded rod couples with a ball joint receiver disposed on the lower surface of the intermediate plate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new engine hoist transmission attachment apparatus and method which has many of the advantages of the engine hoists mentioned heretofore and many novel features that result in a new engine hoist transmission attachment which is not anticipated, rendered obvious, suggested, or even implied by any of the prior art engine hoists, either alone or in any combination thereof.

It is another object of the present invention to provide a new engine hoist transmission attachment which may be easily and efficiently manufactured and marketed.

It is a further object of the present invention to provide a new engine hoist transmission attachment which is of a durable and reliable construction.

An even further object of the present invention is to provide a new engine hoist transmission attachment which is susceptible of a low cost of manufacture with regard to both materials and labor, and which accordingly is then susceptible of low prices of sale to the consuming public, thereby making such engine hoist transmission attachment economically available to the buying public.

Still yet another object of the present invention is to provide a new engine hoist transmission attachment which provides in the apparatuses and methods of the prior art some of the advantages thereof, while simultaneously overcoming some of the disadvantages normally associated therewith.

Still another object of the present invention is to provide a new engine hoist transmission attachment for enabling an engine hoist to remove and install a transmission.

Yet another object of the present invention is to provide a new engine hoist transmission attachment which includes an adaptor portion coupling with an existing engine hoist. The adaptor portion includes a leveling arm positioned essentially parallel to a lifting arm of the engine hoist. A transmission stand is coupled with the adaptor portion and is adapted for supporting a transmission thereon. The transmission stand includes an upper plate supporting the transmission thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
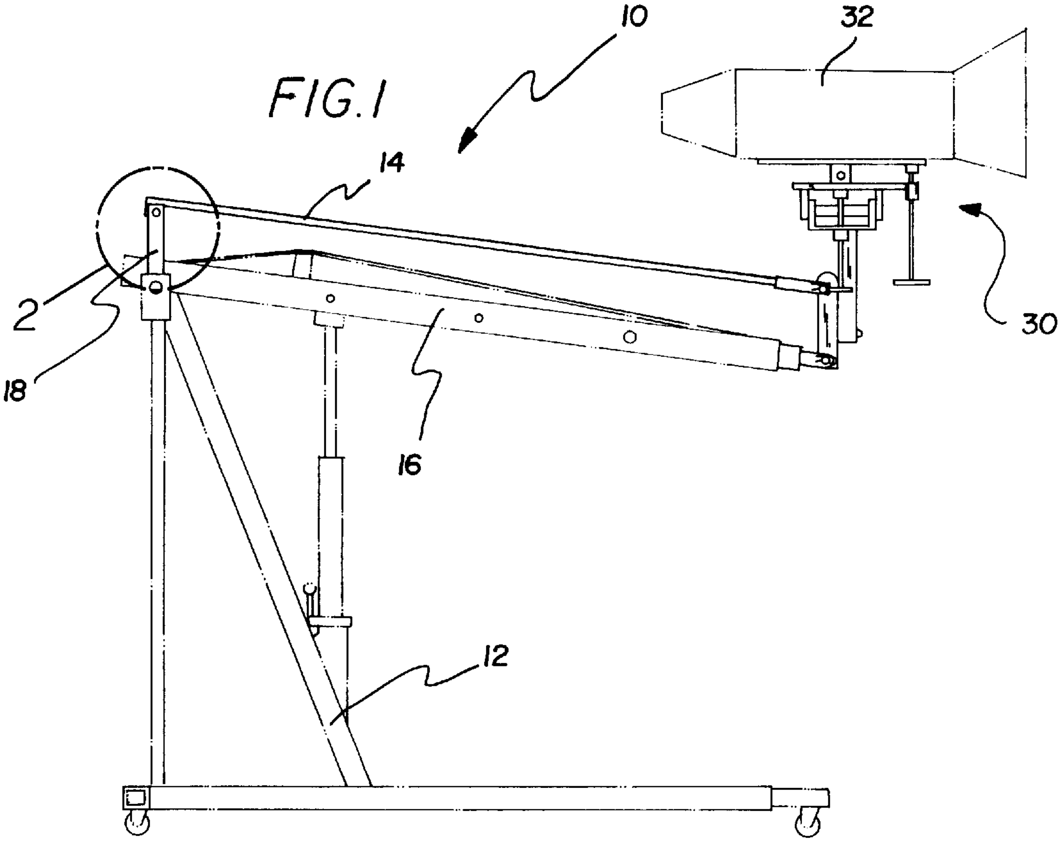
FIG. 1 is a side view of a new engine hoist transmission attachment according to the present invention.
Figure 2:
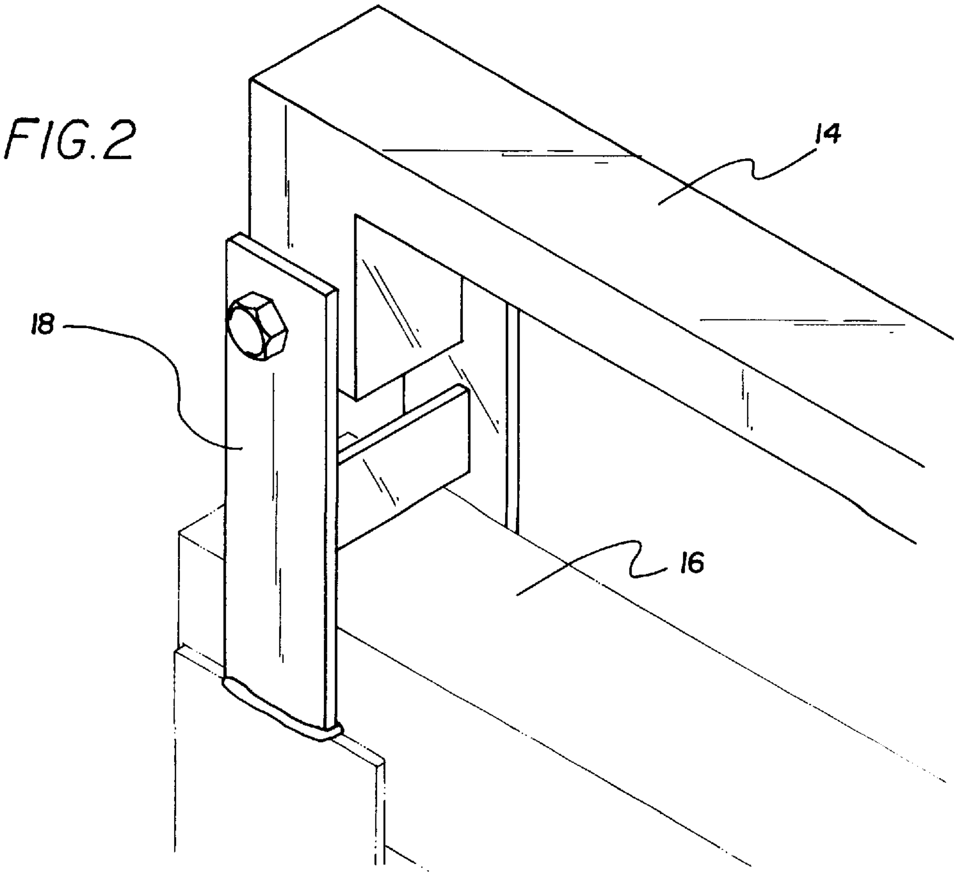
FIG. 2 is a sectional perspective view of the present invention as taken along from circle 2 of FIG. 1.
Figure 3:
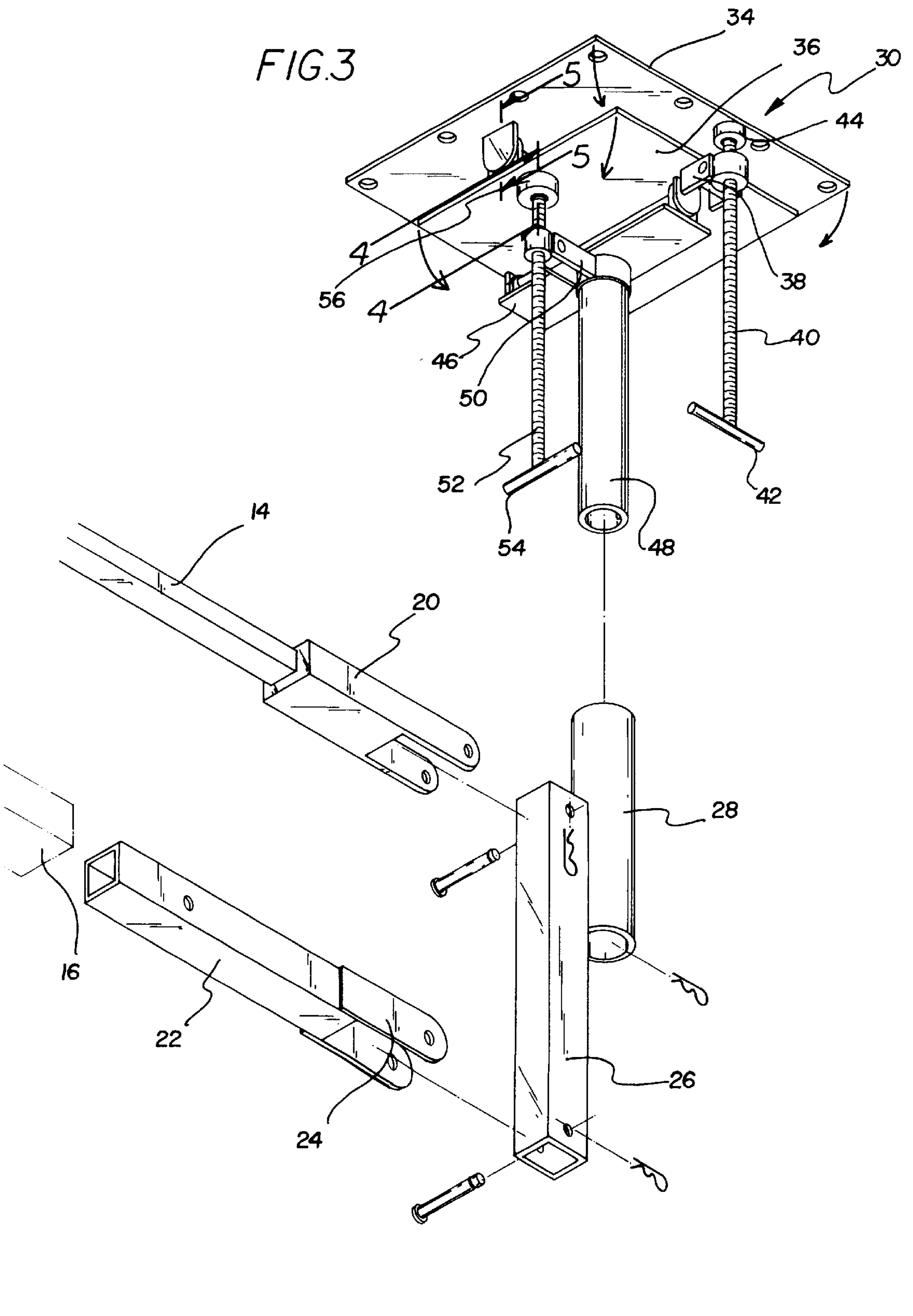
FIG. 3 is an exploded perspective view of the present invention.
Figure 4:
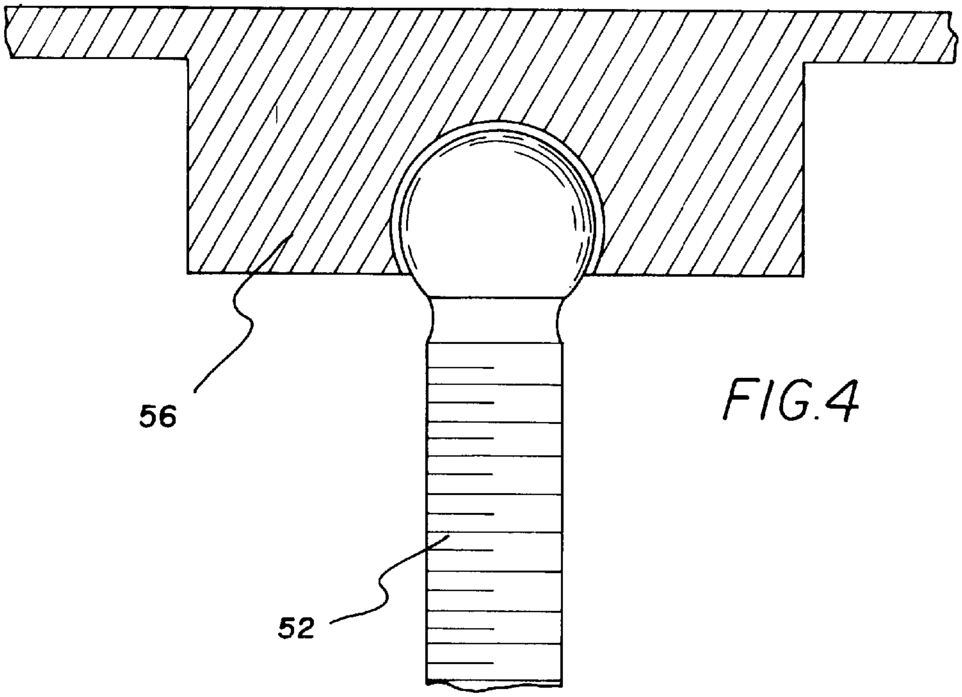
FIG. 4 is a cross-sectional view of the present invention as taken along line 4—4 of FIG. 3.
Figure 5:
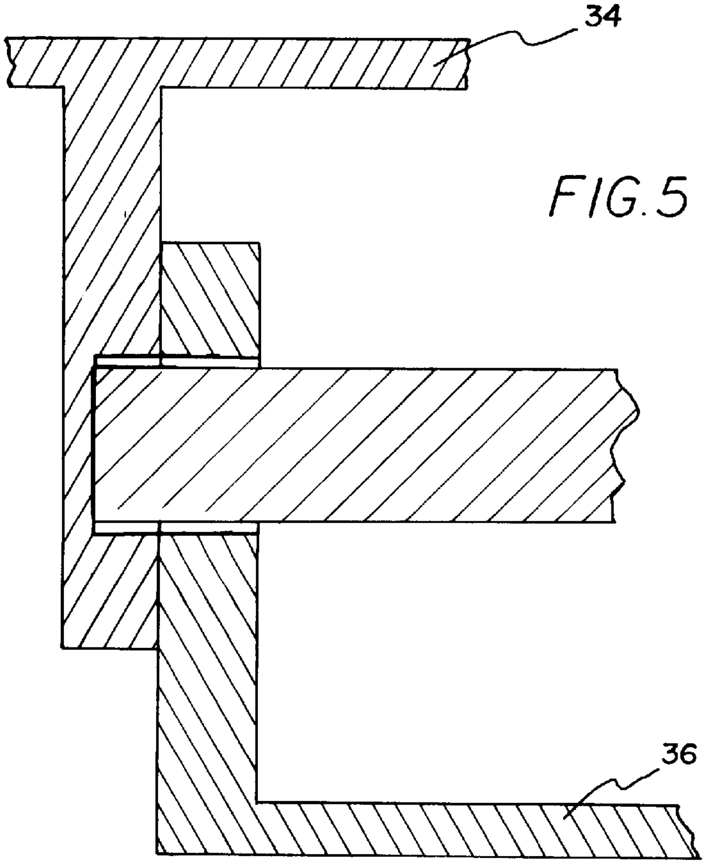
FIG. 5 is a cross-sectional view of the present invention as taken along line 5—5 of FIG. 3.

With reference now to the drawings, and in particular to FIGS. 1 through 5 thereof, a new engine hoist transmission attachment embodying the principles and concepts of the present invention and generally designated by the reference numeral 10 will be described.

As best illustrated in FIGS. 1 through 5, the engine hoist transmission attachment 10 comprises an adaptor portion coupling with an existing engine hoist 12. The adaptor portion includes a leveling arm 14 positioned essentially parallel to a lifting arm 16 of the engine hoist 12. The leveling arm 14 has an inner end pivotally secured to the lifting arm 16 via a leveling arm bracket 18. The leveling arm 14 has a bifurcated bracket 20 extending outwardly from an outer end thereof. The adaptor portion includes a lifting arm coupling bracket 22 extending inwardly of an open outer end of the lifting arm 16. The lifting arm coupling bracket 22 has a bifurcated bracket 24 disposed on an outer end thereof. The bifurcated brackets 20,24 have a vertical post 26 extending therebetween. An upper end of the vertical post 26 has a cylindrical collar 28 extending upwardly therefrom.

A transmission stand 30 is coupled with the adaptor portion and is adapted for supporting a transmission 32 thereon. The transmission stand 30 includes an upper plate 34 supporting the transmission 32 thereon. The transmission stand 30 includes an intermediate plate 36 pivotally secured to a lower surface of the upper plate 34. The intermediate plate 36 has a bracket 38 extending outwardly of a pivot point thereof. The bracket 38 adjustably receives an upper plate level adjuster therein. The upper plate level adjuster is comprised of a threaded rod 40 having a handle 42 disposed on a lower end. An upper end of the threaded rod 40 couples with a ball joint receiver 44 disposed on the lower surface of the upper plate 34. The transmission stand 30 includes a lower plate 46 pivotally secured to a lower surface of the intermediate plate 36. The lower plate 46 has a cylindrical extension 48 extending downwardly therefrom for being received within the cylindrical collar 28 of the adaptor portion. An upper end of the cylindrical extension 48 has a bracket 50 extending outwardly therefrom. The bracket 50 adjustably receives an intermediate plate level adjuster therein. The intermediate plate level adjuster is comprised of a threaded rod 52 having a handle 54 disposed on a lower end. An upper end of the threaded rod 52 couples with a ball joint receiver 56 disposed on the lower surface of the intermediate plate 36.

In use, the upper and intermediate plate level adjusters could be used to create a four-way adjustable plate for optimum positioning when removing and installing a transmission. The existing engine hoist 12 could be used as needed within the auto service shop for engine removal and installation. In the event a mechanic need to remove a transmission, the present invention could be installed on the engine hoist 12. The transmission could then be lifted from the undercarriage of the vehicle for service or replacement.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An engine hoist transmission attachment comprising:

an adaptor portion couplable with an existing engine hoist, the adaptor portion including a leveling arm positionable essentially parallel to a lifting arm of the engine hoist, the leveling arm having an inner end pivotally securable to the lifting arm via a leveling arm bracket, the leveling arm having a bifurcated bracket extending outwardly from an outer end thereof, the adaptor portion including a lifting arm coupling bracket extendable inwardly of an open outer end of the lifting arm, the lifting arm coupling bracket having a bifurcated bracket disposed on an outer end thereof, the bifurcated brackets having a vertical post extending therebetween, an upper end of the vertical post having a cylindrical collar extending upwardly therefrom;

a transmission stand coupled with the adaptor portion and being adapted for supporting a transmission thereon, the transmission stand including an upper plate supporting the transmission thereon, the transmission stand including an intermediate plate pivotally secured to a lower surface of the upper plate, the intermediate plate having a bracket extending outwardly of a pivot point thereof, the bracket adjustably receiving an upper plate level adjuster therein, the upper plate level adjuster comprising a threaded rod having a handle disposed on a lower end, an upper end of the threaded rod coupling with a ball joint receiver disposed on the lower surface of the upper plate, the transmission stand including a lower plate pivotally secured to a lower surface of the intermediate plate, the lower plate having a cylindrical extension extending downwardly therefrom for being received within the cylindrical collar of the adaptor portion, an upper end of the cylindrical extension having a bracket extending outwardly therefrom, the bracket adjustably receiving an intermediate plate level adjuster therein, the intermediate plate level adjuster comprising a threaded rod having a handle disposed on a lower end, an upper end of thc threaded rod coupling with a ball joint receiver disposed on the lower surface of the intermediate plate.

2. An engine hoist transmission attachment for enabling an engine hoist to remove and install a transmission, the engine hoist transmission attachment comprising:

an adaptor portion coupleable with an existing engine hoist, the adaptor portion including a leveling arm positionable essentially parallel to a lifting arm of the engine hoist;

a transmission stand coupled with the adaptor portion and being adapted for supporting a transmission thereon, the transmission stand including an upper plate supporting the transmission thereon; and the adaptor portion including a lifting arm coupling bracket extendable inwardly of an open outer end of the lifting arm of the engine hoist, wherein the lifting arm coupling bracket has a bifurcated bracket disposed on an outer end thereof, the bifurcated bracket and leveling arm having a vertical post extending therebetween, an upper end of the vertical post having a cylindrical collar extending upwardly therefrom.

3. The engine hoist transmission attachment as set forth in claim 2 wherein the leveling arm has an inner end pivotally secured to the lifting arm via a leveling arm bracket, the leveling arm having a bifurcated bracket extendable outwardly from an outer end thereof.

4. The engine hoist transmission attachment as set forth in claim 2 wherein the transmission stand includes an intermediate plate pivotally secured to a lower surface of the upper plate, the intermediate plate having a bracket extending outwardly of a pivot point thereof, the bracket adjustably receiving an upper plate level adjuster therein, the upper plate level adjuster comprising a threaded rod having a handle disposed on a lower end, an upper end of the threaded rod coupling with a ball joint receiver disposed on the lower surface of the upper plate, the transmission stand including a lower plate pivotally secured to a lower surface of the intermediate plate, the lower plate having a cylindrical extension extending downwardly therefrom for being received within the cylindrical collar of the adaptor portion, an upper end of the cylindrical extension having a bracket extending outwardly therefrom, the bracket adjustably receiving an intermediate plate level adjuster therein, the intermediate plate level adjuster comprising a threaded rod having a handle disposed on a lower end, an upper end of the threaded rod coupling with a ball joint receiver disposed on the lower surface of the intermediate plate.

* * * * *